(12) United States Patent
Bishop et al.

(10) Patent No.: US 10,787,599 B2
(45) Date of Patent: Sep. 29, 2020

(54) SULFUR-CONTAINING POLYETHER SURFACTANTS FOR CEMENT SPACER FLUIDS AND OTHER DOWNHOLE APPLICATIONS

(71) Applicant: Chevron Phillips Chemical Company LP, The Woodlands, TX (US)

(72) Inventors: Marshall D. Bishop, Bartlesville, OK (US); Shawn M. Flom, Bartlesville, OK (US); Marcus D. Banks, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 83 days.

(21) Appl. No.: 16/019,621

(22) Filed: Jun. 27, 2018

(65) Prior Publication Data

US 2020/0002595 A1 Jan. 2, 2020

(51) Int. Cl.
*C09K 8/40* (2006.01)
*C09K 8/42* (2006.01)
*E21B 33/14* (2006.01)
*E21B 33/16* (2006.01)

(52) U.S. Cl.
CPC ............... *C09K 8/40* (2013.01); *C09K 8/424* (2013.01)

(58) Field of Classification Search
CPC ........... C09K 8/40; C09K 8/424; E21B 33/14; E21B 33/16
See application file for complete search history.

(56) References Cited

U.S. PATENT DOCUMENTS

| 2,864,866 | A | | 12/1958 | Louthan |
| 3,977,472 | A | | 8/1976 | Graham et al. |
| 4,663,082 | A | | 5/1987 | Bobsein et al. |
| 5,030,366 | A | * | 7/1991 | Wilson .................... C04B 24/28 166/291 |
| 5,480,863 | A | | 1/1996 | Oakley et al. |
| 5,585,334 | A | * | 12/1996 | Shaw ...................... C09K 8/532 507/257 |
| 9,010,423 | B2 | | 4/2015 | Chabert et al. |
| 2006/0079431 | A1 | * | 4/2006 | Lal .......................... A01N 25/30 510/421 |
| 2013/0037265 | A1 | | 2/2013 | Chabert et al. |
| 2013/0092376 | A1 | | 4/2013 | Al-Subhi et al. |
| 2018/0148630 | A1 | * | 5/2018 | Yakovlev .............. C04B 24/383 |

FOREIGN PATENT DOCUMENTS

EP 0430644 6/1991

OTHER PUBLICATIONS

International Search Report and the Written Opinion of the International Searching Authority in PCT/US2019/038258 dated Sep. 9, 2019, 12 pages.
IUPAC Compendium of Chemical Terminology, 2nd Edition, 1997.
"Wettability Test Apparatus, Model C1001, Instruction Manual and API Recommended Practice" 10B-2.

\* cited by examiner

*Primary Examiner* — Crystal J Miller
(74) *Attorney, Agent, or Firm* — Merchant & Gould P.C.

(57) ABSTRACT

Spacer fluid compositions comprising water, a clay, and a sulfur-containing polyether surfactant are disclosed, and such compositions often can further include a weighting additive, an antifoaming additive, and a co-solvent. These spacer fluid compositions can be used to treat metal casing and to remove drilling fluid residue for improved cement bonding in wellbore applications.

21 Claims, No Drawings

SULFUR-CONTAINING POLYETHER SURFACTANTS FOR CEMENT SPACER FLUIDS AND OTHER DOWNHOLE APPLICATIONS

BACKGROUND OF THE INVENTION

Metal pipe, referred to as casing or liner, is used in the drilling process to stabilize and isolate the wellbore from the subterranean formation, to prevent fluid communication between formations (zonal isolation), and to prevent fluid loss into the formation. The metal casing is secured to the formation with cement. The present invention relates generally to compositions, such as spacer fluid compositions, comprising a sulfur-containing polyether surfactant. These compositions can be used to displace the drilling fluid from the annulus between the casing and wellbore, and to treat metal casing in wellbores to improve cement bonding.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various spacer fluid compositions are disclosed herein. In one aspect, the spacer fluid composition can comprise water, a clay, and a sulfur-containing polyether surfactant having formula (I) and/or a sulfur-containing polyether surfactant formula (II):

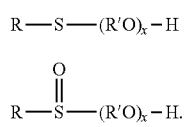

In these formulas, each R independently can be a $C_1$-$C_{30}$ hydrocarbyl group, each R' independently can be a $C_1$-$C_5$ hydrocarbon group, and each x independently can be an integer from 2 to 35. In another aspect, the sulfur-containing polyether surfactant can have formula (III):

$$R—Z—(R'O)_n—H \quad \quad (III),$$

wherein:
R can be a $C_4$-$C_{30}$ hydrocarbyl group, Z can be a sulfide, sulfoxide, or sulfone group, R' can be a $C_2$-$C_4$ hydrocarbon group, and n can be an integer from 2 to 35.

In another aspect, the spacer fluid composition can comprise water, a clay, a sulfur-containing polyether surfactant, a weighting additive, and an antifoaming additive, while in yet another aspect, the spacer fluid composition can comprise water, a clay, a viscosifier additive in addition to clay, a sulfur-containing polyether surfactant, a weighting additive, an antifoaming additive, and a co-solvent.

A method of treating a subterranean formation comprising a wellbore, a drilling fluid, and a metal casing is provided herein, and in an aspect of this invention, this method can comprise introducing any of the spacer fluid compositions disclosed herein into the wellbore to displace at least a portion of the drilling fluid and to treat the metal casing for cement bonding.

Another method provided herein is directed to a method of treating a wellbore annulus in preparation for cementing a wellbore, the wellbore annulus comprising an area between a wellbore wall and an exterior of a metal casing. This method can comprise introducing any of the spacer fluid compositions disclosed herein into the annulus to displace at least a portion of a drilling fluid and to treat the exterior of the metal casing for cement bonding.

Unexpectedly, and beneficially, the spacer fluid compositions are compatible with oil-based drilling fluids, water-based drilling fluids, and water-based cement slurries, and are very effective at treating or cleaning oily residues from metal casing to promote excellent cement bonding.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive designs, compositions, processes, and/or methods consistent with the present disclosure.

While compositions and methods are described herein in terms of "comprising" various components or steps, the compositions and methods also can "consist essentially of" or "consist of" the various components or steps, unless stated otherwise. For example, a spacer fluid composition consistent with aspects of the present invention can comprise; alternatively, can consist essentially of; or alternatively, can consist of; water, a clay, a sulfur-containing polyether surfactant, a weighting additive, and an antifoaming additive.

The terms "a," "an," and "the" are intended to include plural alternatives, e.g., at least one. For instance, the disclosure of "a clay" or "a weighting additive" is meant to encompass one, or mixtures or combinations of more than one, clay or weighting additive, unless otherwise specified.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound or group disclosed herein, any name or structure presented is intended to encompass all structural isomers, conformational isomers, regioisomers, stereoisomers, and mixtures thereof that can arise from a particular set of substituents, unless otherwise specified. The name or structure also encompasses all enantiomers, diastereomers, and other optical isomers (if there are any), whether in enantiomeric or racemic forms, as well as mixtures of stereoisomers, as would be recognized by a skilled artisan, unless otherwise specified. For example, a general reference to hexene (or hexenes) includes all linear or branched, acyclic or cyclic, hydrocarbon compounds having six carbon atoms and 1 carbon-carbon double bond; pentane includes n-pentane, 2-methyl-butane, and 2,2-dimethylpropane; and a general reference to a butyl group includes an n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The term "hydrocarbyl group" is used herein in accordance with the definition specified by IUPAC: a univalent group formed by removing a hydrogen atom from a hydrocarbon (i.e., containing only carbon and hydrogen). Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be acyclic or cyclic, and/or linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane groups, cycloalkyl, cycloalkylene, cycloalkane groups, alkylaryl/arylalkyl, aralkylene, and aralkane groups, respectively, amongst other groups as members.

As disclosed herein, a "sulfur-containing polyether" surfactant contains sulfur, which typically can be in the form of a —S— group (a sulfide group), a —S(═O)— group (a sulfoxide group), or a —S(═O)$_2$— group (a sulfone group). The spacer fluid composition can contain more than one sulfur-containing polyether surfactant; thus, for example, a mixture of a sulfur-containing polyether having a —S— group (a sulfide group) with a sulfur-containing polyether having a —S(═O)— (a sulfoxide group) can be used. The "sulfur-containing polyether" surfactant also contains a repeating —(R'O)— group (a repeating ether group), with R' being any suitable hydrocarbon group or any hydrocarbon group disclosed herein.

In this disclosure, the term "fluid," such as in a spacer fluid composition, is meant to encompass both liquids and mixtures of liquids and solids (e.g., a mixture or slurry of solids in a liquid).

The terms "contact product," "contacting," and the like, are used herein to describe compositions and methods wherein the components are contacted together in any order, in any manner, and for any length of time, unless otherwise specified. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, the term "contacting" is used herein to refer to materials which can be blended, mixed, slurried, dissolved, reacted, treated, or otherwise contacted in some other manner. Therefore, the term "contacting" encompasses the "reacting" of two or more components, and it also encompasses the "mixing" or "blending" of two or more components that do not react with one another.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses, in certain aspects, that the composition can contain from about 0.1 to about 4 gallons (a gallon equals 4 quarts or approximately 3.8 liters) of the sulfur-containing polyether surfactant per barrel of the composition (a barrel equals 42 gallons). By a disclosure that the amount of the sulfur-containing polyether surfactant in the composition can be in a range from about 0.1 to about 4 gallons (per barrel of the composition), the intent is to recite that the amount of the sulfur-containing polyether surfactant can be any amount within the range and, for example, can be equal to about 0.1, about 0.2, about 0.3 about 0.4, about 0.5, about 0.6, about 0.7, about 0.8, about 0.9, about 1, about 1.5, about 2, about 2.5, about 3, about 3.5, or about 4 gallons per barrel of the composition. Additionally, the amount of the sulfur-containing polyether surfactant can be within any range from about 0.1 to about 4 (for example, the amount of the surfactant can be in a range from about 0.2 to about 2 gallons), and this also includes any combination of ranges between about 0.1 and about 4 gallons. Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

The present invention is generally directed to spacer fluid compositions comprising a sulfur-containing polyether surfactant, and to the use of these spacer fluid compositions in downhole or wellbore applications to treat metal casing prior to cementing the casing to the wall of the wellbore or subterranean formation.

Beneficially, the disclosed spacer fluid compositions can displace both oil-based drilling fluids and water-based drilling fluids in wellbores, and are compatible with both oil-based drilling fluids and water-based drilling fluids. Incompatibility between the spacer fluid composition and the drilling fluid can lead to excess ECD (equivalent circulating density), short circuiting, viscosity build, channeling, and poor displacement. These problems are minimized or prevented via the use of the spacer fluid compositions disclosed herein.

Also beneficially, the spacer fluid compositions are compatible with water-based cement slurries that are used to secure metal casing to the wellbore wall or formation. Furthermore, the spacer fluid compositions are extremely effective at treating (or cleaning) the metal casing, and removing oily residues from the metal casing, such that the cement bond with the metal casing is significantly improved.

Unexpectedly, the spacer fluid composition—comprising one or more sulfur-containing polyether surfactants—of this invention has superior wettability performance (e.g., treating or cleaning oily residues from metal surfaces to provide water wettability) than comparable or otherwise identical spacer fluid compositions that contain conventional ethoxylated alcohol surfactants.

Spacer Fluid Compositions

Aspects of this invention are directed to compositions comprising water, a clay, and a non-ionic sulfur-containing polyether surfactant. These compositions can be used as spacer fluids in wellbore applications to treat metal casing, thereby providing a better bonding surface for the cement slurry that is used to secure the metal casing to the wellbore wall.

Water is the primary component of the composition, on a volumetric basis. The amount of water in the composition can vary significantly based on the specifics of the wellbore application, but generally falls within a range from about 50 vol % to about 99.9 vol %. In some aspects, from about 60 vol % to about 98 vol %, or from about 70 vol % to about 98 vol %, of the composition is water, while in other aspects, from 70 vol % to about 95 vol %, from about 75 vol % to about 95 vol %, or from about 75 vol % to about 90 vol %, of the composition is water.

In one aspect, the sulfur-containing polyether surfactant can have formula (I) or the sulfur-containing polyether surfactant can have formula (II). As disclosed herein, a mixture of compounds having formula (I) and formula (II) also can be used in the spacer fluid composition.

Within formulas (I) and (II), R, R', and x are independent elements of the sulfur-containing polyether surfactant. Accordingly, the sulfur-containing polyether surfactants having formula (I) and (II) can be described using any combination of R, R', and x disclosed herein. Unless otherwise specified, formulas (I) and (II) above, and any sulfur-containing polyether compound, complex, or species disclosed herein are not designed to show stereochemistry or isomeric positioning of the different moieties (e.g., these formulas are not intended to display rac or meso isomers, or R or S diastereoisomers), although such compounds are contemplated and encompassed by these formulas and/or structures, unless stated otherwise.

In formulas (I) and (II), each R independently can be a $C_1$-$C_{30}$ hydrocarbyl group, for instance, a $C_1$-$C_{18}$ hydrocarbyl group, a $C_1$-$C_{12}$ hydrocarbyl group, a $C_2$-$C_{30}$ hydrocarbyl group, or a $C_2$-$C_{18}$ hydrocarbyl group. It is contemplated that R in formula (I) can be the same as, or different from, R in formula (II). The hydrocarbyl group which can be R in formulas (I) and (II), independently, can be a $C_1$ to $C_{30}$ alkyl group, a $C_2$ to $C_{30}$ alkenyl group, a $C_4$ to $C_{30}$ cycloalkyl group, a $C_6$ to $C_{30}$ aryl group, or a $C_7$ to $C_{30}$ aralkyl group. For instance, each R independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; or alternatively, each R independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group.

Accordingly, in some aspects, the alkyl group which can be R in formula (I) and/or formula (II) can be a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, or an octadecyl group; alternatively, a methyl group, an ethyl group, a propyl group, a butyl group, a pentyl group, a hexyl group, a heptyl group, an octyl group, a nonyl group, or a decyl group; alternatively, an octyl group, a nonyl group, a decyl group, an undecyl group, a dodecyl group, a tridecyl group, a tetradecyl group, a pentadecyl group, a hexadecyl group, a heptadecyl group, or an octadecyl group; or alternatively, a decyl group, an undecyl group, a dodecyl group, a tridecyl group, or a tetradecyl group. In particular aspects of this invention, R in formula (I) and/or formula (II) can be a $C_1$ to $C_{15}$ alkyl group; alternatively, a $C_6$ to $C_{16}$ alkyl group; alternatively, a $C_{10}$ to $C_{14}$ alkyl group; or alternatively, a $C_{12}$ alkyl group. These alkyl groups can be linear or branched.

Suitable alkenyl groups which can be R in formula (I) and/or (II) can include, but are not limited to, an ethenyl group, a propenyl group, a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one aspect, R in formula (I) and/or (II) independently can be an ethenyl group, a propenyl group, a butenyl group, a pentenyl group, a hexenyl group, a heptenyl group, an octenyl group, a nonenyl group, or a decenyl group, while in another aspect, R formula (I) and/or (II) independently can be an ethenyl group, a propenyl group, a butenyl group, a pentenyl group, or a hexenyl group. For example, R can be an ethenyl group; alternatively, a propenyl group; alternatively, a butenyl group; alternatively, a pentenyl group; or alternatively, a hexenyl group. In yet another aspect, R can be a terminal alkenyl group, such as a $C_3$ to $C_{18}$ terminal alkenyl group, a $C_3$ to $C_{12}$ terminal alkenyl group, or a $C_3$ to $C_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

R in formula (I) and/or (II) independently can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, R can be a cyclopentyl group, a substituted cyclopentyl group, a cyclohexyl group, or a substituted cyclohexyl group. Moreover, R can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be R in formula (I) and/or (II).

In some aspects, the aryl group which can be R in formula (I) and/or (II) can be a phenyl group, a substituted phenyl group, a naphthyl group, or a substituted naphthyl group. In an aspect, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be R in formula (I) and/or (II).

In an aspect, the substituted phenyl group which can be R in formula (I) and/or (II) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other aspects, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be R in formula (I) and/or (II).

In some aspects, the aralkyl group which can be R in formula (I) and/or (II) can be a benzyl group or a substituted benzyl group. In an aspect, the aralkyl group can be a benzyl group or, alternatively, a substituted benzyl group. Substituents which can be utilized for the substituted aralkyl group are independently disclosed herein and can be utilized without limitation to further describe the substituted aralkyl group which can be R in formula (I) and/or (II).

In an aspect, each non-hydrogen substituent(s) for the substituted cycloalkyl group, substituted aryl group, or substituted aralkyl group which can be R in formula (I) and/or (II) independently can be a $C_1$ to Cis hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be R in formula (I) and/or (II). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

In formulas (I) and (II), each R' independently can be a $C_1$-$C_5$ hydrocarbon group, for instance, a $C_1$-$C_4$ hydrocarbon group, a $C_1$-$C_3$ hydrocarbon group, a $C_2$-$C_5$ hydrocarbon group, a $C_2$-$C_4$ hydrocarbon group, or a $C_2$-$C_3$ hydrocarbon group. It is contemplated that R' in formula (I) can be the same as, or different from, R' in formula (II). The hydrocarbon group which can be R' in formulas (I) and (II), independently, can be a methylene group, an ethylene group, a propylene group, a butylene group, or a pentylene group; alternatively, a methylene group, an ethylene group, or a propylene group; or alternatively, an ethylene group or a propylene group. In some aspects, R' in formula (I) and formula (II) can be a methylene group; alternatively, an ethylene group; or alternatively, a propylene group.

The integer "x" in formulas (I) and (II) independently can range from 2 to 35 (inclusive). It is contemplated that x in formula (I) can be the same as, or different from, x in formula (II). In one aspect, x in formula (I) and/or (II) can range from 2 to 15, while in another aspect, x in formula (I) and/or (II) can range from 3 to 10, and in yet another aspect, x in formula (I) and/or (II) can range from 5 to 9. For instance, x in formula (I) and formula (II) can be equal to 5; alternatively, equal to 6; alternatively, equal to 7, alternatively, equal to 8; or alternatively, equal to 9.

Thus, the $(R'O)_x$ group in formulas (I) and (II) can encompass polyoxymethylene groups, polyoxyethylene groups, polyoxypropylene groups, polyoxybutylene groups, and the like. Therefore, illustrative and non-limiting examples of sulfur-containing polyether surfactants encompassed by formula (I) can include t-dodecyl polyoxyethylene sulfide, n-dodecyl polyoxyethylene sulfide, decyl polyoxyethylene sulfide, dodecyl polyoxypropylene sulfide, tetradecyl polyoxypropylene sulfide, octadecyl polyoxypropylene sulfide, decyl polyoxybutylene sulfide, dodecyl polyoxybutylene sulfide, undecyl polyoxybutylene sulfide, and the like. These sulfur-containing polyether surfactants can have any suitable number of repeating units ("x"), typically from 2 to 35, from 2 to 15, from 3 to 10, from 5 to 9, or equal to 6, or equal to 7, or equal to 8. Hence, a specific example of a sulfur-containing polyether surfactant encompassed by formula (I) is t-dodecyl polyoxyethylene sulfide with seven oxyethylene repeat units: R is a $C_{12}$ alkyl group, R' is an ethylene group, and x is equal to 7.

Likewise, illustrative and non-limiting examples of sulfur-containing polyether surfactants encompassed by formula (II) can include t-dodecyl polyoxyethylene sulfoxide, n-dodecyl polyoxyethylene sulfoxide, decyl polyoxyethylene sulfoxide, dodecyl polyoxypropylene sulfoxide, tetradecyl polyoxypropylene sulfoxide, octadecyl polyoxypropylene sulfoxide, decyl polyoxybutylene sulfoxide, dodecyl polyoxybutylene sulfoxide, undecyl polyoxybutylene sulfoxide, and the like. These sulfur-containing polyether surfactants can have any suitable number of repeating units ("x"), typically from 2 to 35, from 2 to 15, from 3 to 10, from 5 to 9, or equal to 6, or equal to 7, or equal to 8. Hence, a specific example of a sulfur-containing polyether surfactant encompassed by formula (II) is t-dodecyl polyoxyethylene sulfoxide with seven oxyethylene repeat units: R is a $C_{12}$ alkyl group, R' is an ethylene group, and x is equal to 7.

The sulfur-containing polyether surfactant having formula (I) or formula (II) (or any mixture of sulfur-containing polyether surfactants having formula (I) and (II)) can be prepared using any suitable technique, such as described in U.S. Pat. Nos. 2,864,866 and 4,663,082, incorporated herein by reference in their entirety. When a mixture of sulfur-containing polyether surfactants is used, the relative amount of the surfactant(s) having formula (I) and the surfactant(s) having formula (II) in the mixture is not particularly limited, but typically ranges from about 10:1 to about 1:10 by weight (ratio of (I):(II) in the mixture). In some aspects, the weight ratio of the sulfide surfactant(s) having formula (I) to the sulfide surfactant(s) having formula (II) can range from about 9:1 to about 1:9, from about 6:1 to about 1:6, from about 4:1 to about 1:4, from about 3:1 to about 1:3, or from about 2:1 to about 1:2. In circumstances where the sulfur-containing polyether surfactant(s) having formula (II) is/are the majority of the mixture, the relative amount of the surfactant(s) having formula (I) and the surfactant(s) having formula (II) in the mixture typically ranges from about 1:2 to about 1:10 by weight, or from about 1:3 to about 1:9 (ratio of (I):(II) in the mixture).

In another aspect of this invention, the sulfur-containing polyether surfactant can have formula (III):

R—Z—(R'O)$_n$—H      (III).

In formula (III), R can be a $C_4$-$C_{30}$ hydrocarbyl group, such as any $C_4$-$C_{30}$ hydrocarbyl group disclosed hereinabove in relation to formulas (I) and (II). Thus, R in formula (III) can be a $C_4$ to $C_{30}$ alkyl group; alternatively, a $C_4$ to $C_{18}$ alkyl group; alternatively, a $C_6$ to $C_{16}$ alkyl group; alternatively, a $C_{10}$ to $C_{14}$ alkyl group; or alternatively, a $C_{12}$ alkyl group. These alkyl groups can be linear or branched.

Z in formula (III) can be a sulfide, sulfoxide, or sulfone group; alternatively, a sulfide or sulfoxide group; alternatively, a sulfide group; alternatively, a sulfoxide group; or alternatively, a sulfone group. R' in formula (III) can be a $C_2$-$C_4$ hydrocarbon group, for instance, an ethylene group, a propylene group, or a butylene group; alternatively, an ethylene group or a propylene group; alternatively, an ethylene group; or alternatively, a propylene group. The integer "n" in formula (III) can range from 2 to 35 (inclusive). In one aspect, n in formula (III) can range from 2 to 15, while in another aspect, n can range from 3 to 10, and in yet another aspect, n can range from 5 to 9. For instance, n in formula (III) can be equal to 5; alternatively, equal to 6; alternatively, equal to 7, alternatively, equal to 8; or alternatively, equal to 9.

Generally, the same illustrative and non-limiting examples of specific sulfur-containing polyether surfactants encompassed by formulas (I) and (II) also are encompassed by formula (III), e.g., t-dodecyl polyoxyethylene sulfide with seven oxyethylene repeat units, t-dodecyl polyoxyethylene sulfoxide with seven oxyethylene repeat units, and the like. The spacer fluid composition also can contain a mixture or combination of more than one sulfur-containing polyether surfactant having formula (III). As an example, the spacer fluid composition can contain a mixture of a sulfide polyether surfactant and a sulfoxide polyether surfactant, at a weight ratio from about 10:1 to about 1:10 (ratio of sulfide:sulfoxide surfactant in the mixture).

The sulfur-containing polyether surfactant having formula (I), formula (II), and/or formula (III), or any mixture of sulfur-containing polyether surfactants having formulas (I), (II), and/or (III), can be prepared using any suitable technique, such as described in U.S. Pat. Nos. 2,864,866 and 4,663,082, incorporated herein by reference in their entirety.

An illustrative and non-limiting example of a mixture of sulfur-containing polyether surfactants that is suitable for use in the spacer fluid compositions of this invention is AQUA-CLEEN®, commercially available from Chemical Products Industries.

The sulfur-containing polyether surfactant (or mixture of surfactants) often can be characterized by a cloud point (1 wt. % aqueous solution) that generally falls within a range from about 55° C. to about 85° C., more particularly from about 60° C. to about 80° C., but is not limited solely to these ranges. The cloud point of surfactants, in accordance with the present disclosure, can be determined by ASTM D2024-09 (2017), entitled "Standard Test Method for Cloud Point of Nonionic Surfactants." According to this test method, particularly useful for non-ionic surfactants, a one percent test solution is prepared by weighing one gram of the surfactant into a 150 mL beaker, to which 100 mL of distilled, demineralized water at a temperature of less than 30° C. (86° F.) are added. The sample is agitated until solution is reached, after which a 50 mL aliquot of the solution is placed into a test tube. While agitating the sample solution slowly with a thermometer, the test tube is heated with a Bunsen burner until the sample solution becomes definitely cloudy, at which point it is removed from the heat. While stirring with the thermometer continues, the test tube and its sample solution are allowed to cool slowly until the sample solution clarifies, at which point the temperature is noted. Such a test method provides a simple, yet reliable, means for determining the cloud point of a sulfide surfactant in water.

In some aspects of this invention, the sulfur-containing polyether surfactant (or mixture) can be characterized by a cloud point (1 wt. % aqueous solution) that falls within a range from about 63° C. to about 80° C. The cloud point of the sulfur-containing polyether surfactant (or mixture) is believed to be comparable to or greater than the cloud point of typical ethoxylated alcohols surfactants. For instance, the cloud point of Dow TERGITOL™ TMN-6 ethoxylated alcohol surfactant, described to be a secondary alcohol ethoxylate, has a cloud point (1 wt. % aqueous solution) of about 36° C., and the cloud point of Dow TERGITOL™ TMN-10 ethoxylated alcohol surfactant has a cloud point (1 wt. % aqueous solution) of about 76° C.

While not being limited thereto, the amount of the sulfur-containing polyether surfactant in the composition (a total amount if more than one sulfur-containing polyether surfactant is present in the composition) typically falls in the range from about from about 0.05 gallons to about 10 gallons of the sulfur-containing polyether surfactant per barrel of the composition. In some aspects, the composition can contain from about 0.05 gallons to about 6 gallons, from about 0.1 gallons to about 4 gallons, or from about 0.1 gallons to about 3 gallons, of the sulfur-containing polyether surfactant per barrel of the composition. In other aspects, the composition can contain from about 0.2 gallons to about 3 gallons, from about 0.2 gallons to about 2 gallons, or from about 0.2 gallons to about 1.2 gallons, of the sulfur-containing polyether surfactant per barrel of the composition.

Any suitable clay or modified clay can be used in the compositions of the present disclosure. Illustrative and non-limiting examples of suitable clay materials include bentonite, sepiolite, attapulgite, montmorillionite, kaolinite, and the like, as well as treated and modified clay materials. Combinations of two or more clay materials can be used in the composition, if desired.

The amount of clay in the composition typically ranges from about 1 lb to about 100 lb of clay per barrel of the composition. For instance, the composition can contain, per barrel of the composition, from about 2 lb to about 40 lb of clay; alternatively, from about 3 lb to about 20 lb of clay; alternatively, from about 4 lb to about 15 lb of clay; or alternatively, from about 5 lb to about 10 lb of clay.

Optionally, the composition can further comprise a suitable viscosifier additive, i.e., in addition to the clay material described above. The viscosifier additive increases the viscosity of the composition, but also can reduce fluid loss into the formation. Representative and non-limiting examples of viscosifier additives (also known as gelling agents) that can be used in the composition of the present disclosure include guar, hydroxypropyl guar (HPG), xanthan gum, welan gum, cellulose, carboxymethyl cellulose (CMC), carboxymethyl hydroxyethyl cellulose (CMHEC), hydroxyethyl cellulose (HEC), carboxymethylhydroxypropyl guar (CMHPG), galactomannan gum and a gum comprising galactomannans, as well as any mixture of combination thereof.

Additional natural polymers suitable for use as viscosifier additives/gelling agents in accordance with the present disclosure include, but are not limited to, locust bean gum, tara (*Cesalpinia spinosa* lin) gum, konjac (*Amorphophallus konjac*) gum, starch, karaya gum, tragacanth gum, arabic gum, ghatti gum, tamarind gum, carrageenan and derivatives thereof. Additionally, synthetic polymers and copolymers also can be used. Examples of such synthetic polymers include, but are not limited to, polyacrylate, polymethacrylate, polyacrylamide, polyvinyl alcohol, maleic anhydride, methylvinyl ether copolymers, and polyvinylpyrrolidone.

Other components that can be present in the composition can include, but are not limited to, a weighting additive, an antifoaming additive, and a co-solvent. Illustrative and non-limiting examples of weighting additives include anglesite ($PbSO_4$), barite (barium sulfate, $BaSO_4$), galena (PbS), celestite ($SrSO_4$), hematite ($Fe_2O_3$), iron oxides, magnetite, calcium carbonate (calcite), ilmenite ($FeTiO_3$), siderite, dolomite, and the like, as well as any mixture or combination thereof. When present, typical ranges for the amount of the weighting additive per barrel of the spacer fluid composition of the disclosure include the following: from about 50 lb to about 500 lb, from about 100 lb to about 500 lb, from about 150 lb to about 450 lb, and from about 200 lb to about 400 lb. The amount of the weighting additive often depends on the design density of the spacer fluid composition.

Illustrative and non-limiting examples of antifoaming additives include silicon materials (e.g., an organosilicone or siloxane), polyethylene glycols, polypropylene glycols (e.g., polypropylene glycol 4000), and the like, as well as any mixture or combination thereof. When present, typical ranges for the amount of the antifoaming additive per barrel of the composition include the following: from about 0.01 gallons to about 1 gallon, from about 0.05 gallons to about 0.5 gallons, from about 0.05 gallons to about 0.4 gallons, and from about 0.075 gallons to about 0.3 gallons.

Illustrative and non-limiting examples of suitable co-solvents include a dialkyl ether, diethylene glycol mono butyl ether, and the like, as well as any mixture or combination thereof. Generally, co-solvents are organic liquids that are soluble in, and/or miscible with, both water and the base oils used in drilling fluids. When present, any suitable amount of the co-solvent can be used in the composition.

As disclosed herein, water is the primary component of the composition, on a volumetric basis. Notwithstanding, the composition can contain small amount of hydrocarbons (e.g., oils), with standard amounts of less than or equal to about 10 vol % of the composition. In many instances, the composition contains less than or equal to about 5 vol %, or less than or equal to about 1 vol %, of hydrocarbons.

Given the numerous components that can be present in the spacer fluid composition and their respective amounts, the density of the composition can vary over a wide range, such as from about 8.5 lb/gallon to about 22 lb/gallon. More typically, the density of the composition falls within a range from about 8.5 lb/gallon to about 20 lb/gallon, from about 9 lb/gallon to about 18 lb/gallon, from about 9 lb/gallon to about 16 lb/gallon, or from about 9.5 lb/gallon to about 15.5 lb/gallon. While not required, often the density of the spacer fluid composition can be 0.5-1.0 lb/gallon greater in density that that of the drilling fluid. Additionally or alternatively, the density of the spacer fluid composition can be less than the density of the cement slurry. Typical cement slurry formulations can have densities of approximately 13 lb/gallon to 19 lb/gallon. For cement test purposes, the API cement classes have standard densities ranging from 14.8 lb/gallon to 16.4 lb/gallon. Two commonly used API cements are Class G and Class H with qualification densities of 15.8 lb/gallon and 16.4 lb/gallon, respectively.

It can be advantageous for the spacer fluid composition to have compatibility with other fluids or mixtures that it comes in contact with while inside the wellbore. Thus, consistent with aspects of this invention, the composition can be compatible with a water-based drilling fluid, which is often referred to as a water-based mud, abbreviated WBM. Additionally or alternatively, the composition can be compatible with an oil-based drilling fluid or invert emulsion oil based fluid, which are often referred to as oil-based mud, abbreviated OBM. Additionally or alternatively, the composition can be compatible with a water-based cement slurry, which is often used to secure metal casing to the wellbore wall. API 10B-2 Section 16 describes a method to test the compatibility of fluids. Spacer compatibility can be quantified with a R-index value, which is calculated by selecting the highest viscosity of a OBM-spacer mixture (or WBM-spacer mixture, or cement slurry-spacer mixture) measured at 100 RPM on a standard Coulette coaxial cylinder rotational viscometer (such as a Fann 35 equipped with an R1B1 rotor bob configuration) minus the highest viscosity of either 100% spacer composition or 100% OBM (or WBM, or cement slurry). A R-index value of less than 40 equates to excellent compatibility, and a R-index from 41 to 70 equates to slight incompatibility, while a R-index above 70 equates to incompatibility. The R-index value for the disclosed spacer fluid compositions with an OBM (or WBM, or cement slurry) generally is less than 40, and in some cases, less than 30, less than 20, or less than 10.

It can be advantageous for the spacer fluid composition to effectively treat or clean oily materials from metal surfaces, which can be determined in a water-wetting capability test (WWCT) as described in API 10B-2. Unexpectedly, the spacer fluid compositions disclosed herein—comprising one or more sulfur-containing polyether surfactants—have superior wettability as compared to otherwise identical compositions containing ethoxylated alcohol surfactants (i.e., instead of the sulfur-containing polyether surfactant). The wettability performance can be quantified by the amount of spacer fluid composition (in mL) required to reach a conductivity of 175 Hogans, under test conditions described herein for the Fann C1001 wettability test apparatus. In sum, the wettability test is a laboratory measurement of the ability or capacity of the spacer fluid composition (e.g., comprising a sulfur-containing polyether surfactant) to reverse the OBM emulsion from oil-continuous to water-continuous and to clean the instrument contacts in order to conduct electricity in a mixture containing an OBM drilling fluid. The spacer fluid compositions disclosed herein (comprising 1 gallon/barrel of sulfur-containing polyether surfactant(s)), unexpectedly, can reach a conductivity of 175 Hogans in a mixture with 200 mL of a standard OBM with the addition of less than 400 mL of the spacer fluid composition, and in some instances, less than 375 mL, less than 350 mL, less than 325 mL, less than 300 mL, or less than 275 mL, of the spacer fluid composition.

Beneficially, and unexpectedly, the spacer fluid compositions disclosed herein—comprising a sulfur-containing polyether surfactant—can require less volume of the spacer fluid composition to achieve 175 Hogans than that of otherwise identical compositions containing an ethoxylated alcohol surfactant (i.e., instead of the sulfur-containing polyether surfactant). Thus, for this comparison, other than the surfactant selection, the density and all components of the spacer fluid compositions are the same, and the amounts of water and barite are adjusted slightly to compensate for differences in density, if any, between the respective surfactants.

Any suitable technique and equipment can be used to prepare the spacer fluid compositions described hereinabove. The various components—water, clay, and surfactant(s), and other additives or materials that may be present—can be mixed in any order or sequence.

Treatment Methods

One aspect of this invention is directed to a method of treating a subterranean formation comprising a wellbore, a drilling fluid, and a metal casing (also referred to as liner, conduit, or pipe). In this aspect, the method can comprise introducing any spacer fluid composition disclosed herein into the wellbore to displace at least a portion of the drilling fluid and to treat (or clean) the metal casing for cement bonding. Another aspect of this invention is directed to a method of treating a wellbore annulus in preparation for cementing a wellbore, the wellbore annulus comprising an area between a wellbore wall and an exterior of a metal casing (also referred to as conduit or pipe). In this aspect, the method can comprise introducing any spacer fluid composition disclosed herein into the annulus to displace at least a portion of a drilling fluid and to treat (or clean) the exterior of the metal casing for cement bonding. In these aspects, the treatment of the exterior of the metal casing with the spacer fluid composition results in improved cement bonding.

These methods are not limited to downhole operations using any particular drilling fluid. For instance, the drilling fluid can be a water-based drilling fluid. A water-based drilling fluid often is referred to as a water-based mud, abbreviated WBM.

In particular aspects of this invention, the drilling fluid can be an oil-based drilling fluid. An oil-based drilling fluid often is referred to as an oil-based mud, abbreviated OBM. Typical OBM formulations are petroleum-based or hydrocarbon-based, and are water-in-oil emulsions in which water represents less than 50 vol % of the liquid volume, i.e., water is the minor component.

Generally, it is desirable for the spacer fluid composition to displace a majority (and in an ideal situation, all) of the drilling fluid in the wellbore and the wellbore annulus. Often, at least about 75 vol % of the drilling fluid remaining in the annulus (between the metal casing and the wellbore wall) is displaced by the spacer fluid composition. More often, at least about 85 vol %, at least about 90 vol %, at least about 95 vol %, or at least about 98 vol %, of the drilling fluid present in the annulus can be displaced by the spacer fluid composition.

The methods disclosed herein can further comprise a step of introducing a cement slurry into the wellbore (and wellbore annulus) for attaching at least a portion of the casing to the wellbore wall. While the disclosed methods are not limited to any particular cement slurry formulation, often the cement slurry is a water-based cement slurry. Generally, it is desirable for the cement slurry to displace a majority (and in an ideal situation, all) of the spacer fluid composition in the wellbore annulus. Often, at least about 75 vol % of the spacer fluid composition remaining in the annulus (between the metal casing and the wellbore wall) is displaced by the cement slurry. More often, at least about 85 vol %, at least about 90 vol %, at least about 95 vol %, or at least about 98 vol %, of the spacer fluid composition present in the annulus can be displaced by the cement slurry.

The methods disclosed herein are not limited to any particular set of temperature conditions that may be encountered in the wellbore. In one aspect, the maximum temperature (encountered by the spacer fluid composition) in the wellbore can in a range from about 0° C. to about 225° C., while in another aspect, the maximum temperature can be in a range from about 10° C. to about 200° C., and in yet another aspect, the maximum temperature can be in a range from about 20° C. to about 175° C. The spacer fluid compositions disclosed herein perform unexpectedly well at elevated temperatures, and thus the treatment methods can be used in wellbore operations in which elevated formation temperatures exist (e.g., such as 150° C. and above). Therefore, in addition to the temperature ranges noted above, the methods (and spacer fluid compositions) described hereinabove are suitable for use in wellbores in which maximum temperatures ranging from about 100° C. to about 175° C., or from about 150° C. to about 225° C., are encountered.

Concentrated Surfactant Compositions

Disclosed hereinabove are spacer fluid compositions comprising, at a minimum, water, any clay material disclosed herein, and any sulfur-containing polyether surfactant disclosed herein. The compositions are suitable for use, with or without additional additives, in wellbore applications to treat metal casing to improve cement bonding to the metal casing.

Also contemplated herein are concentrated sulfur-containing polyether surfactant compositions that can be combined with any of the additives disclosed herein (e.g., clays, weighting additives, antifoaming additives, etc.) to form spacer fluid compositions or concentrated sulfur-containing polyether surfactant compositions that can be used in other stages of the overall process (e.g., during drilling operations). Thus, such compositions can be configured for use in wellbore drilling applications.

In one aspect, the concentrated sulfur-containing polyether surfactant composition can comprise (or consist essentially of, or consist of) water and from about 25 vol % to about 99 vol % of the sulfur-containing polyether surfactant (a total amount if more than one sulfur-containing polyether surfactant is present). In another aspect, the concentrated sulfur-containing polyether surfactant composition can comprise (or consist essentially of, or consist of) water and from about 30 vol % to about 60 vol % of the sulfur-containing polyether surfactant. In yet another aspect, the concentrated sulfur-containing polyether surfactant composition can comprise (or consist essentially of, or consist of) water and from about 30 vol % to about 45 vol % of the sulfur-containing polyether surfactant. Generally, this concentrated sulfur-containing polyether surfactant composition can be a concentrated liquid and be substantially free of solids, i.e., can contain less than 10 wt. % of solids. More often, the concentrated sulfur-containing polyether surfactant composition can contain less than 5 wt. % of solids, less than 2 wt. % of solids, less than 1 wt. % of solids, or less than 0.5 wt. % of solids.

Optionally, the concentrated sulfur-containing polyether surfactant composition can further comprise any co-solvent disclosed herein, and at any suitable amount. Additionally or alternatively, the concentrated sulfur-containing polyether surfactant composition can further comprise any antifoaming additive disclosed herein, and at any suitable amount.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Examples 1-2

Wettability Testing

A laboratory invert emulsion oil-based drilling fluid (oil-based mud, abbreviated OBM) was used as a standard OBM for the wettability testing. A batch of approximately 1828.6 mL of the OBM with a density of 8.546 lb/gallon, containing 27 vol % liquid phase (oil:water ratio of 75:25 by volume) was prepared. The OBM was prepared using a Silverson L5M mixer, in which 1210.2 mL of diesel base oil (common #2 diesel) was added to the mixing vessel, with the mixing head positioned near the bottom of the mixing vessel. The mixer speed was set at 4000 RPM; however, if excessive splashing was observed, the RPM was decreased as necessary. Mixer speed was increased back to 4000 RPM as tolerated by the addition of the other components. First, 30 g of organophillic clay (VG-69 available from M-I Swaco Drilling Fluids) was added to the diesel base oil, and mixing was continued at 4000 RPM for 30 minutes. The following additives were sequentially added to the mixture of the diesel oil and clay while maintaining mixing at 4000 RPM: 34.2 grams of lime, $Ca(OH)_2$, were sifted and then added, followed by the addition of 40 g of an emulsifier (Versacoat available from M-I Swaco Drilling Fluids), 20 g of a wetting agent (Versawet available from M-I Swaco Drilling Fluids), and 9.2 g of a rheology modifier (Versamod available from M-I Swaco Drilling Fluids).

Mixing was continued for an additional 10 minutes, followed by the addition of a separately prepared brine solution. The brine solution was prepared by mixing 402.8 g of water and 172.6 g of $CaCl_2$), and dissolving the $CaCl_2$). The temperature increased during the dissolution processes, and this brine solution was set aside and allowed to cool before addition to the mixing vessel. The mixing speed was increased to 6000 RPM. The temperature of the mixture was monitored while mixing for an additional 20 minutes. The high shear mixing will generate heat and the temperature can increase to 160° F. If the temperature reached 160° F. before 20 minutes, the RPM was reduced to 4000 RPM for the remainder of the 20 minutes. The mixing time was adjusted to insure that the temperature was maintained at 160° F. for at least 5 minutes. Next, at a mixing speed of 4000 RPM, 161 grams of API clay (API standard evaluation base clay, available from OFI Test Equipment, Houston, Tex.) were added, followed by mixing for 10 minutes at 4000 RPM. The laboratory OBM was transferred to a storage container and allowed to cool to room temperature.

The spacer fluid composition of Example 1 contained a sulfur-containing polyether surfactant. AQUA-CLEEN® was the surfactant, and AQUA-CLEEN® is a mixture of t-dodecyl polyoxyethylene sulfide (seven oxyethylene repeat units) and t-dodecyl polyoxyethylene sulfoxide (seven oxyethylene repeat units). First, a dry component premix was made by blending the following components and respective amounts:

| Component | Wt. % |
| --- | --- |
| Bentonite | 32.00 |
| ATBS copolymer (HE ® 300 polymer)[1] | 16.00 |
| Sulfomethylated quebracho[1] | 9.00 |
| Causticized Lignite | 2.10 |
| Stannous Sulfate | 0.66 |
| Acrylic copolymer (Aquatreat ® AR540D)[2] | 2.50 |
| Hydroxymethyl carboxymethyl cellulose (Diacel ® LWL)[1] | 3.54 |
| Polynaphthalene sulfonic acid, sodium salt (Diacel ® RPM)[1] | 9.00 |
| Sepiolite Clay | 25.20 |
| Total | 100.00 |

[1]Available from Drilling Specialties Company (Bartlesville, OK, USA).
[2]Available from ALCO Chemical (a division of National Starch and Chemical Company, Chattanooga, TN. USA).

A 600-mL batch of a 13 lb/gallon spacer fluid composition containing AQUA-CLEEN® was produced using a Yamato LR400D mixer equipped with a 5-blade mixing propeller. Approximately 473.8 mL (33.2 gallons/barrel) of deionized water was added to a vessel, and the mixer was started at 40-70 RPM. Then, 1.43 g (0.1 gallons/barrel) of polypropylene glycol 4000 antifoaming additive was added and mixed for 15 seconds, followed by sifting 22.25 grams (13 lb/barrel) of the previously prepared dry premix into the water while maintaining stirring. The addition rate was adjusted as needed to prevent the formation of wetted lumps (commonly referred to as fisheyes). The mixing speed was increased to 110-130 RPM for 20 minutes, followed by the addition of 422.2 g barite (246.2 lb/barrel) and mixing for 5 minutes. Then, 14.98 g (1 gallon/barrel) of the sulfur-containing polyether surfactant (AQUA-CLEEN®) was added and mixed for 30 seconds, thereby forming the spacer fluid composition of Example 1.

The spacer fluid composition of Example 2 contained a conventional ethoxylated alcohol surfactant, a 50:50 mixture of Dow TERGITOL™ TMN-6 ethoxylated alcohol surfactant and Dow TRITON™ CG-110 alkyl polyglucoside surfactant. A 600-mL batch of a 13 lb/gallon spacer fluid composition containing the ethoxylated alcohol surfactant mixture (at 1 gallon/barrel; 15.5 grams) was produced in generally the same manner and the same composition as that of Example 1. Due to the different density of the ethoxylated alcohol surfactant, the amount of water (474 mL) and barite (421.5 grams) were adjusted slightly to result in 600 mL of the 13 lb/gallon composition containing 1 gallon/barrel of the ethoxylated alcohol surfactant mixture.

Wettability testing of the spacer fluids of Examples 1-2 was performed using a Fann C1001 wettability test apparatus, and the test procedure was performed generally in accordance with the Wettability Test Apparatus, Model C1001, Instruction Manual and API Recommended Practice 10B-2, incorporated herein by reference in its entirety. The apparatus consists of a double-walled stainless steel mixing container, mixer base, electronic control unit (for measuring electrical conductivity, in Hogans, of the contents of the mixing container), and variable transformer. The mixing container can be used on any mixer/blender base with continuous variable speed. For Examples 1-2, 200 mL of the standard laboratory OBM was charged to the mixing container at a temperature of 87.8° C. (190° F.), which was maintained throughout the experiment. A target conductivity value of 175 Hogans was used to assess relative performance of the spacer fluid compositions and their ability to invert the emulsion and wet/clean the metal electrode (and thus, conduct electricity in the presence of the oil-based drilling fluid, or OBM). To the 200 mL of the OBM, 10 mL aliquots of the spacer fluid composition were added and the meter reading was allowed to stabilize before the next addition (10 seconds between additions if no change in meter reading, increasing to as much as 1 minute between additions as the meter reading changed with the addition of additional spacer). The respective amounts of the spacer fluid compositions of Examples 1-2 to reach 175 Hogans (if achievable) were determined. The results are shown in the table below.

Unexpectedly, the spacer fluid composition of Example 1 (with a sulfur-containing polyether surfactant) achieved the desired 175 Hogans level with the addition of only 260 mL of the spacer fluid composition, whereas the spacer fluid composition of Example 2 (with a conventional ethoxylated alcohol surfactant) was not able to invert the emulsion, nor wet the electrodes, after the addition of 400 mL of the spacer fluid composition.

| Example 2 (mL) | Hogans (Hn) | Example 1 (mL) | Hogans (Hn) |
| --- | --- | --- | --- |
| 0 | 0 | 0 | 0 |
| 10 | 0 | 10 | 0 |
| 20 | 0 | 20 | 0 |
| 30 | 0 | 30 | 0 |
| 40 | 0 | 40 | 0 |
| 50 | 0 | 50 | 0 |
| 60 | 0 | 60 | 0 |
| 70 | 0 | 70 | 0 |
| 80 | 0 | 80 | 0 |
| 90 | 0 | 90 | 0 |
| 100 | 0 | 100 | 0 |
| 110 | 0 | 110 | 0 |
| 120 | 0 | 120 | 0 |
| 130 | 0 | 130 | 0 |
| 140 | 0 | 140 | 0 |
| 150 | 0 | 150 | 0 |
| 160 | 0 | 160 | 0 |
| 170 | 0 | 170 | 0 |
| 180 | 0 | 180 | 0 |
| 190 | 0 | 190 | 0 |
| 200 | 0 | 200 | 0 |
| 210 | 0 | 210 | 0 |
| 220 | 0 | 220 | 12.5 |
| 230 | 0 | 230 | 162.5 |
| 240 | 0 | 240 | 160 |
| 250 | 0 | 250 | 165 |
| 260 | 0 | 260 | 175 |
| 270 | 0 | | |
| 280 | 0 | After 10 min | 190 |
| 290 | 2.5 | | |
| 300 | 7.5 | | |
| 310 | 10 | | |
| 320 | 15 | | |
| 330 | 15 | | |
| 340 | 25 | | |
| 350 | 25 | | |
| 360 | 30 | | |
| 370 | 30 | | |
| 380 | 35 | | |
| 390 | 40 | | |
| 400 | 45 | | |

Examples 3-4

Wettability Testing

Examples 3-4 used the same standard OBM formulation used in Examples 1-2. The spacer fluid composition of Example 3 contained a sulfur-containing polyether surfactant. AQUA-CLEEN® was the surfactant, and AQUA-CLEEN® is a mixture of t-dodecyl polyoxyethylene sulfide (seven oxyethylene repeat units) and t-dodecyl polyoxyethylene sulfoxide (seven oxyethylene repeat units). First, a dry component premix was made by blending the following components and respective amounts:

| Component | Wt. % |
| --- | --- |
| Bentonite | 40.00 |
| Hydroxymethyl carboxymethyl cellulose (Diacel ® LWL)[1] | 10.00 |
| Polynaphthalene sulfonic acid, sodium salt (Diacel ® RPM)[1] | 10.00 |
| Sepiolite Clay | 40.00 |
| Total | 100.00 |

[1]Available from Drilling Specialties Company (Bartlesville, OK, USA).

A 600-mL batch of a 13 lb/gallon spacer fluid composition containing AQUA-CLEEN® was produced using a Yamato LR400D mixer equipped with a 5-blade mixing propeller. Approximately 473.8 mL (33.2 gallons/barrel) of deionized water was added to a vessel, and the mixer was started at 40-70 RPM. Then, 1.43 g (0.1 gallons/barrel) of polypropylene glycol 4000 antifoaming additive was added and mixed for 15 seconds, followed by sifting 22.25 grams (13 lb/barrel) of the previously prepared dry viscosifier premix into the water while maintaining stirring. The addition rate was adjusted as needed to prevent the formation of wetted lumps (commonly referred to as fisheyes). The mixing speed was increased to 110-130 RPM for 20 minutes, followed by the addition of 422.2 g barite (246.2 lb/barrel) and mixing for 5 minutes. Then, 15.0 g (1 gallon/barrel) of the sulfur-containing polyether surfactant (AQUA-CLEEN®) was added and mixed for 30 seconds, thereby forming the spacer fluid composition of Example 3.

The spacer fluid composition of Example 4 contained a conventional ethoxylated alcohol surfactant, a 50:50 mixture of Dow TERGITOL™ TMN-6 ethoxylated alcohol surfactant and Dow TRITON™ CG-110 alkyl polyglucoside surfactant. A 600-mL batch of a 13 lb/gallon spacer fluid composition containing the ethoxylated alcohol surfactant mixture (at 1 gallon/barrel; 15.4 grams) was produced in generally the same manner and the same composition as that of Example 3. Due to the different density of the ethoxylated alcohol surfactant, the amount of water (473.9 mL) and barite (421.6 grams) were adjusted slightly to result in 600 mL of the 13 lb/gallon composition containing 1 gallon/barrel of the ethoxylated alcohol surfactant mixture.

Wettability testing of the spacer fluids of Examples 3-4 was performed using the same procedure and equipment as that of Examples 1-2. To the 200 mL of the OBM, 10 mL titrations of the spacer fluid composition were added; the temperature was maintained at 87.8° C. (190° F.). The respective amounts of the spacer fluid compositions of Examples 3-4 to reach 175 Hogans (if achievable) were determined. The results are shown in the table below.

Using 1 gallon/barrel of the sulfur-containing polyether surfactant mixture, Example 3 reached 130 Hogans after the addition of 420 mL of the spacer fluid composition, and further increased to 160 Hogans after mixing for an additional 10 minutes. Example 4, which contained the mixture of ethoxylated alcohol and alkyl glucoside surfactants, only reached 62 Hogans after addition of 440 mL of spacer fluid composition, and subsequently increased to 142 Hogans after mixing for an additional 10 minutes. While neither spacer composition was able to achieve the desired 175 Hogans level, unexpectedly, the spacer fluid composition of Example 3 resulted in higher conductivity values, as compared to that of Example 4, at the same addition amounts of surfactants and spacer fluid compositions.

| Example 3 (mL) | Hogans (Hn) | Example 4 (mL) | Hogans (Hn) |
| --- | --- | --- | --- |
| 0 | 0 | 0 | 0 |
| 10 to 120 | 0 | 10 to 120 | 0 |
| 130 | 0 | 130 | 0 |
| 140 | 0 | 140 | 0 |
| 150 | 0 | 150 | 0 |
| 160 | 0 | 160 | 0 |
| 170 | 0 | 170 | 0 |
| 180 | 0 | 180 | 0 |
| 190 | 0 | 190 | 0 |
| 200 | 0 | 200 | 0 |
| 210 | 0 | 210 | 0 |
| 220 | 0 | 220 | 0 |
| 230 | 45 | 230 | 0 |
| 240 | 55 | 240 | 0 |
| 250 | 57.5 | 250 | 5 |
| 260 | 65 | 260 | 10 |
| 270 | 70 | 270 | 15 |
| 280 | 75 | 280 | 17.5 |
| 290 | 87.5 | 290 | 25 |
| 300 | 85 | 300 | 30 |
| 310 | 90 | 310 | 35 |
| 320 | 95 | 320 | 40 |
| 330 | 95 | 330 | 45 |
| 340 | 95 | 340 | 50 |
| 350 | 100 | 350 | 50 |
| 360 | 100 | 360 | 50 |
| 370 | 115 | 370 | 52.5 |
| 380 | 120 | 380 | 52.5 |
| 390 | 125 | 390 | 52.5 |
| 400 | 130 | 400 | 52.5 |
| 410 | 130 | 410 | 50 |
| 420 | 130 | 420 | 50 |
|  |  | 430 | 60 |
| After 10 min | 160 | 440 | 62.5 |
|  |  | After 10 min | 142.5 |

Examples 5-6

Wettability Testing

Examples 5-6 used the same standard OBM formulation used in Examples 1-4; however, the surfactant loading was increased to 1.5 gallons/barrel. The spacer fluid composition of Example 5 contained a sulfur-containing polyether surfactant. AQUA-CLEEN® was the surfactant, and AQUA-CLEEN® is a mixture of t-dodecyl polyoxyethylene sulfide (seven oxyethylene repeat units) and t-dodecyl polyoxyethylene sulfoxide (seven oxyethylene repeat units). First, a dry component premix was made by blending the following components and respective amounts:

| Component | Wt. % |
| --- | --- |
| Bentonite | 40.00 |
| Hydroxymethyl carboxymethyl cellulose (Diacel ® LWL)[1] | 10.00 |
| Polynaphthalene sulfonic acid, sodium salt (Diacel ® RPM)[1] | 10.00 |
| Sepiolite Clay | 40.00 |
| Total | 100.00 |

[1]Available from Drilling Specialties Company (Bartlesville, OK, USA).

A 600-mL batch of a 13 lb/gallon spacer fluid composition containing AQUA-CLEEN® was produced using a Yamato LR400D mixer equipped with a 5-blade mixing propeller. Approximately 466.8 mL (32.7 gallons/barrel) of deionized water was added to a vessel, and the mixer was started at 40-70 RPM. Then, 1.43 g (0.1 gallons/barrel) of polypropylene glycol 4000 antifoaming additive was added and mixed for 15 seconds, followed by sifting 22.25 grams (13 lb/barrel) of the previously prepared dry viscosifier premix into the water while maintaining stirring. The addition rate was adjusted as needed to prevent the formation of wetted lumps (commonly referred to as fisheyes). The mixing speed was increased to 110-130 RPM for 20 minutes, followed by the addition of 421.7 g barite (246.4 lb/barrel) and mixing for 5 minutes. Then, 22.5 g (1.5 gallons/barrel) of the sulfur-containing polyether surfactant (AQUA-CLEEN®) was added and mixed for 30 seconds, thereby forming the spacer fluid composition of Example 5.

The spacer fluid composition of Example 6 contained a conventional ethoxylated alcohol surfactant, a 50:50 mixture of Dow TERGITOL™ TMN-6 ethoxylated alcohol surfactant and Dow TRITON™ CG-110 alkyl polyglucoside surfactant. A 600-mL batch of a 13 lb/gallon spacer fluid composition containing the ethoxylated alcohol surfactant mixture (at 1.5 gallons/barrel; 23.1 grams) was produced in generally the same manner and the same composition as that of Example 5. Due to the different density of the ethoxylated alcohol surfactant, the amount of water (467.0 mL) and barite (420.9 grams) were adjusted slightly to result in 600 mL of the 13 lb/gallon composition containing 1.5 gallons/barrel of the ethoxylated alcohol surfactant mixture.

Wettability testing of the spacer fluids of Examples 5-6 was performed using the same procedure and equipment as that of Examples 1-2. To the 200 mL of the OBM (190 mL was used for Example 5), 10 mL titrations of the spacer fluid composition were added; the temperature was maintained at 87.8° C. (190° F.). The respective amounts of the spacer fluid compositions of Examples 5-6 to reach 175 Hogans (if achievable) were determined. The results are shown in the table below.

Using 1.5 gallons/barrel of the sulfur-containing polyether surfactant mixture, Example 5 unexpectedly reached 175 Hogans after 300 mL of the spacer fluid composition, whereas Example 6 required 420 mL to reach 175 Hogans. After 10 minutes of additional mixing, Example 5 increased to 185 Hogans, while Example 6 decreased to 85 Hogans.

| Example 5 (mL) | Hogans (Hn) | Example 6 (mL) | Hogans (Hn) |
|---|---|---|---|
| 0 | 0 | 0 | 0 |
| 10 to 120 | 0 | 10 to 120 | 0 |
| 130 | 0 | 130 | 0 |
| 140 | 2.5 | 140 | 0 |
| 150 | 10 | 150 | 0 |
| 160 | 15 | 160 | 0 |
| 170 | 35 | 170 | 0 |
| 180 | 45 | 180 | 0 |
| 190 | 75 | 190 | 0 |
| 200 | 95 | 200 | 0 |
| 210 | 115 | 210 | 0 |
| 220 | 125 | 220 | 0 |
| 230 | 135 | 230 | 0 |
| 240 | 135 | 240 | 2.5 |
| 250 | 162.5 | 250 | 5 |
| 260 | 160 | 260 | 10 |
| 270 | 165 | 270 | 10 |
| 280 | 170 | 280 | 30 |
| 290 | 170 | 290 | 32.5 |
| 300 | 175 | 300 | 45 |
|  |  | 310 | 50 |
| After 10 min | 185 | 320 | 57.5 |
|  |  | 330 | 80 |
|  |  | 340 | 82.5 |
|  |  | 350 | 95 |
|  |  | 360 | 102.5 |
|  |  | 370 | 115 |
|  |  | 380 | 130 |
|  |  | 390 | 155 |
|  |  | 400 | 155 |
|  |  | 410 | 170 |
|  |  | 420 | 175 |
|  |  | After 10 min | 85 |

Examples 7-8

Compatibility Testing

The spacer fluid compositions of Example 1 (containing 1 gallon/barrel of sulfur-containing polyether surfactant mixture) and Example 2 (containing 1 gallon/barrel of a conventional ethoxylated alcohol surfactant mixture) were evaluated for compatibility with a laboratory invert emulsion oil-based drilling fluid (oil-based mud, abbreviated OBM) containing C16/C18 internal olefins. The 14 lb/gallon OBM contained the following components:

| Component | Amount |
|---|---|
| C16/C18 internal olefins | 143 g |
| Water | 58.8 mL |
| Calcium chloride | 19.9 g |
| Vg-69 clay | 6.0 g |
| Lime | 5.0 g |
| EZ Mul surfactant | 6.0 g |
| Invermul surfactant | 6.0 g |
| API Clay | 27.0 g |
| Barite | 315.8 g |

At a temperature of 93° C., the viscosity of the OBM, the spacer fluid composition of Example 1 (containing 1 gallon/barrel of the sulfur-containing polyether surfactant mixture), the spacer fluid composition of Example 2 (containing 1 gallon/barrel of the conventional ethoxylated alcohol surfactant mixture), and mixtures of the OBM and spacer fluid compositions were determined at a stirrer speed of 100 rpm. The results are summarized in the table below for Examples 7-8, using the spacer fluid compositions described in Examples 1-2, respectively. The R-index value is the highest viscosity of any OBM-spacer mixture minus the highest viscosity of either 100% spacer composition or 100% OBM. As shown by the R-index values of less than 10 in the table, both spacer fluid compositions had excellent compatibility with the C16/C18 internal olefin-based OBM.

| | Compatibility Test | |
|---|---|---|
| | Example 7 | Example 8 |
| | Spacer Fluid Composition | |
| | Example 1 | Example 2 |
| | Dial Reading | |
| 100% OBM | 28 | 28 |
| 95% OBM/5% Spacer | 30 | 28 |
| 75% OBM/25% Spacer | 41 | 31 |
| 50% OBM/50% Spacer | 57 | 29 |
| 25% OBM/75% Spacer | 70 | 31 |
| 5% OBM/95% Spacer | 73 | 42 |
| 100% spacer | 80 | 48 |
| R-index | −7 | −6 |

Examples 9-10

Compatibility Testing

The spacer fluid compositions of Example 1 (containing 1 gallon/barrel of sulfur-containing polyether surfactant mixture) and Example 2 (containing 1 gallon/barrel of a conventional ethoxylated alcohol surfactant mixture) were evaluated for compatibility with a laboratory invert emulsion oil-based drilling fluid (oil-based mud, abbreviated OBM) containing octyl heptanoate. The 16 lb/gallon OBM contained the following components:

| Component | Amount |
| --- | --- |
| Octyl heptanoate | 161.6 g |
| Water | 32.9 mL |
| Calcium chloride | 11.0 g |
| Vg-69 clay | 6.0 g |
| Lime | 5.0 g |
| EZ Mul surfactant | 6.0 g |
| Invermul surfactant | 5.0 g |
| API Clay | 27.0 g |
| Barite | 419.8 g |

At a temperature of 93° C., the viscosity of the OBM, the spacer fluid composition of Example 1 (containing 1 gallon/barrel of the sulfur-containing polyether surfactant mixture), the spacer fluid composition of Example 2 (containing 1 gallon/barrel of the conventional ethoxylated alcohol surfactant mixture), and mixtures of the OBM and spacer fluid compositions were determined at a stirrer speed of 100 rpm. The results are summarized in the table below for Examples 9-10, using the spacer fluid compositions described in Examples 1-2, respectively. The R-index value is the highest viscosity of any OBM-spacer mixture minus the highest viscosity of either 100% spacer composition or 100% OBM. As shown by the R-index values of less than 30 in the table, both spacer fluid compositions had excellent compatibility with the octyl heptanoate-based OBM.

| | Compatibility Test | |
| --- | --- | --- |
| | Example 9 | Example 10 |
| | Spacer Fluid Composition | |
| | Example 1 | Example 2 |
| | Dial Reading | |
| 100% OBM | 27 | 27 |
| 95% OBM/5% Spacer | 30 | 31 |
| 75% OBM/25% Spacer | 52 | 50 |
| 50% OBM/50% Spacer | 95 | 78 |
| 25% OBM/75% Spacer | 68 | 45 |
| 5% OBM/95% Spacer | 57 | 48 |
| 100% spacer | 68 | 49 |
| R-index | 27 | 29 |

Examples 11-12

Compatibility Testing

The spacer fluid compositions of Example 1 (containing 1 gallon/barrel of sulfur-containing polyether surfactant mixture) and Example 2 (containing 1 gallon/barrel of a conventional ethoxylated alcohol surfactant mixture) were evaluated for compatibility with a laboratory invert emulsion oil-based drilling fluid (oil-based mud, abbreviated OBM) containing hydrogenated mineral oil. The OBM contained the following components:

| Component | Amount (g) |
| --- | --- |
| Escaid 110 mineral oil | 1060 |
| Water | 285.2 |
| Calcium chloride | 122.25 |
| Vg-69 clay | 43.75 |
| Lime | 37.5 |
| EZ Mul surfactant | 37.5 |
| Invermul surfactant | 37.5 |

At a temperature of 93° C., the viscosity of the OBM, the spacer fluid composition of Example 1 (containing 1 gallon/barrel of the sulfur-containing polyether surfactant mixture), the spacer fluid composition of Example 2 (containing 1 gallon/barrel of the conventional ethoxylated alcohol surfactant mixture), and mixtures of the OBM and spacer fluid compositions were determined at a stirrer speed of 100 rpm. The results are summarized in the table below for Examples 11-12, using the spacer fluid compositions described in Examples 1-2, respectively. The R-index value is the highest viscosity of any OBM-spacer mixture minus the highest viscosity of either 100% spacer composition or 100% OBM. As shown by the R-index values of less than 10 in the table, both spacer fluid compositions had excellent compatibility with the mineral oil-based OBM.

| | Compatibility Test | |
| --- | --- | --- |
| | Example 11 | Example 12 |
| | Spacer Fluid Composition | |
| | Example 1 | Example 2 |
| | Dial Reading | |
| 100% OBM | 6 | 6 |
| 95% OBM/5% Spacer | 8 | 6 |
| 75% OBM/25% Spacer | 12 | 8 |
| 50% OBM/50% Spacer | 19 | 12 |
| 25% OBM/75% Spacer | 29 | 19 |
| 5% OBM/95% Spacer | 47 | 40 |
| 100% spacer | 49 | 44 |
| R-index | −2 | −4 |

Examples 13-14

Wettability Testing With Field OBM

Spacer fluid compositions were evaluated with a field OBM from a drilling operation in west Texas. The OBM formulation was a 13.7 lb/gallon diesel OBM with an oil:water ratio of 80.6:19.4 (79.4 vol % oil, 20.6 vol % brine). The internal brine phase contained approximately 21.9 wt. % calcium chloride (18.8 vol %). The OBM contained 276 lb/barrel of barite and 75 lb/barrel (8.25 vol %) of low gravity solids (e.g., organophillic clay and drill solids). The overall OBM was 58 vol % oil and 14 vol % water. The spacer fluid composition of Example 13 contained a sulfur-containing polyether surfactant (AQUA-CLEEN®), and was similar to Example 5, except the surfactant loading was 2 gallons/barrel. The spacer fluid composition of Example 14 contained a conventional ethoxylated alcohol surfactant, and was similar to Example 6, except the surfactant loading was 2 gallons/barrel. Thus, the only difference between the 14 lb/gallon spacer fluid compositions used in Example 13 and Example 14 was the type of surfactant.

Wettability testing of the spacer fluids of Examples 13-14 was performed using the same procedure and equipment as that of Examples 1-2. To a 200 mL sample of the OBM, 10 mL titrations of the spacer fluid composition were added; the temperature was maintained at 93° C. (200° F.). The respective amounts of the spacer fluid compositions of Examples 13-14 to reach 175 Hogans (if achievable) were determined. The results are shown in the table below.

Using 2 gallons/barrel of the sulfur-containing polyether surfactant mixture, Example 13 unexpectedly reached 175 Hogans after 280 mL of the spacer fluid composition, whereas Example 14 did not exceed 135 Hogans after the addition of 360 mL. Thus, the wettability examples demonstrate that the spacer fluid compositions disclosed herein—comprising a sulfur-containing polyether surfactant—required less volume of the spacer fluid composition to achieve 175 Hogans than that of otherwise identical compositions containing an ethoxylated alcohol surfactant (i.e., instead of the sulfur-containing polyether surfactant), at any equivalent surfactant loading (e.g., in the 1-2 gallons/barrel range). Therefore, and beneficially, the spacer fluid compositions disclosed herein—comprising a sulfur-containing polyether surfactant—are more effective at treating or cleaning oily materials from metal surfaces, which would result in superior cement bonding to metal surfaces in wellbore applications.

| Example 13 (mL) | Hogans (Hn) | Example 14 (mL) | Hogans (Hn) |
|---|---|---|---|
| 0 | 5 | 0 | 20 |
| 10 | 5 | 10 | 22.5 |
| 20 | 5 | 20 | 22.5 |
| 30 | 5 | 30 | 20 |
| 40 | 10 | 40 | 22.5 |
| 50 | 10 | 50 | 20 |
| 60 | 10 | 60 | 20 |
| 70 | 10 | 70 | 15 |
| 80 | 7.5 | 80 | 15 |
| 90 | 10 | 90 | 12.5 |
| 100 | 10 | 100 | 12.5 |
| 110 | 2.5 | 110 | 12.5 |
| 120 | 2.5 | 120 | 12.5 |
| 130 | 2.5 | 130 | 10 |
| 140 | 2.5 | 140 | 10 |
| 150 | 2.5 | 150 | 12.5 |
| 160 | 10 | 160 | 12.5 |
| 170 | 55 | 170 | 15 |
| 180 | 110 | 180 | 15 |
| 190 | 100 | 190 | 15 |
| 200 | 90 | 200 | 25 |
| 210 | 95 | 210 | 42 |
| 220 | 105 | 220 | 45 |
| 230 | 115 | 230 | 45 |
| 240 | 130 | 240 | 40 |
| 250 | 135 | 250 | 45 |
| 260 | 160 | 260 | 50 |
| 270 | 170 | 270 | 55 |
| 280 | 175 | 280 | 60 |
|  |  | 290 | 65 |
| After 10 min | 190 | 300 | 75 |
|  |  | 310 | 80 |
|  |  | 320 | 90 |
|  |  | 330 | 90 |
|  |  | 340 | 120 |
|  |  | 350 | 130 |
|  |  | 360 | 135 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A (spacer fluid) composition comprising water, a clay, and a sulfur-containing polyether surfactant having formula (I) and/or a sulfur-containing polyether surfactant formula (II):

wherein:
each R independently is a $C_1$-$C_{30}$ hydrocarbyl group;
each R' independently is a $C_1$-$C_5$ hydrocarbon group; and
each x independently is an integer from 2 to 35.

Aspect 2. The composition of aspect 1, wherein each R independently is a $C_{10}$-$C_{14}$ alkyl group (e.g., a $C_{12}$ alkyl group), each R' independently is an ethylene group or a propylene group (e.g., an ethylene group), and each x independently is an integer from 3 to 10 (e.g., x is from 5 to 9, or x is equal to 7), and the composition contains a mixture of the surfactant having formula (I) and the surfactant having formula (II) at a weight ratio of (I):(11) in the mixture from about 10:1 to about 1:10 (or from about 9:1 to about 1:9).

Aspect 3. A (spacer fluid) composition comprising water, a clay, and a sulfur-containing polyether surfactant having formula (III):

$$R—Z—(R'O)_n—H \quad (III),$$

wherein:
R is a $C_4$-$C_{30}$ hydrocarbyl group (e.g., R is a $C_{10}$-$C_{14}$ alkyl group);
Z is a sulfide, sulfoxide, or sulfone group (e.g., Z is a sulfide or sulfoxide group);
R' is a $C_2$-$C_4$ hydrocarbon group (e.g., R' is an ethylene or propylene group); and
n is an integer from 2 to 35 (e.g., n is from 3 to 10, or from 5 to 9).

Aspect 4. The composition of any one of aspects 1-3, wherein the composition comprises any suitable amount of the surfactant or any amount disclosed herein, e.g., from about 0.05 gallons to about 10 gallons, from about 0.1 gallons to about 4 gallons, from about 0.2 gallons to about 2 gallons, or from about 0.2 gallons to about 1.2 gallons, of the sulfur-containing polyether surfactant per barrel of the composition.

Aspect 5. The composition of any one of aspects 1-4, wherein the clay comprises any suitable clay or any clay disclosed herein, e.g., bentonite, sepiolite, attapulgite, montmorillionite, or any combination thereof.

Aspect 6. The composition of any one of aspects 1-5, wherein the composition further comprises any suitable viscosifier additive or any viscosifier additive disclosed herein (in addition to clay), e.g., xanthan gum, welan gum, CMHEC, HEC, a galactomannan, a non-ionic or ionic copolymer, a vinyl polymer or copolymer, a polyacylamide, a polyvinyl pyrrolidone, a polyvinyl alcohol, an ATBS polymer or copolymer, or any combination thereof.

Aspect 7. The composition of any one of aspects 1-6, wherein the composition comprises any suitable amount of clay or any amount disclosed herein, e.g. from about 1 lb to about 100 lb, from about 2 lb to about 40 lb, from about 3 lb to about 20 lb, or from about 5 lb to about 10 lb, of the clay per barrel of the composition.

Aspect 8. The composition of any one of aspects 1-7, wherein the composition has any suitable density or a density in any range disclosed herein, e.g., from about 8.5 lb/gallon to about 22 lb/gallon, from about 9 lb/gallon to about 16 lb/gallon, or from about 9.5 lb/gallon to about 15.5 lb/gallon.

Aspect 9. The composition of any one of aspects 1-8, wherein the composition comprises any suitable amount of hydrocarbons or an amount of hydrocarbons in any range disclosed herein, e.g., less than or equal to about 10 vol %, less than or equal to about 5 vol %, or less than or equal to about 1 vol %, of hydrocarbons (e.g., oils).

Aspect 10. The composition of any one of aspects 1-9, wherein the composition further comprises any suitable co-solvent or any co-solvent disclosed herein, e.g., a dialkyl ether, diethylene glycol mono butyl ether, or any combination thereof.

Aspect 11. The composition of any one of aspects 1-10, wherein the water is any suitable amount of the composition or any amount disclosed herein, e.g., from about 50 vol % to about 99.9 vol %, from about 60 vol % to about 98 vol %, or from 70 vol % to about 95 vol %, of the composition.

Aspect 12. The composition of any one of aspects 1-11, wherein the composition further comprises any suitable antifoaming additive or any antifoaming additive disclosed herein.

Aspect 13. The composition of aspect 12, wherein the antifoaming additive comprises silicon (e.g., an organosilicone), a polyethylene glycol, a polypropylene glycol (polypropylene glycol 4000), or any combination thereof.

Aspect 14. The composition of aspect 12 or 13, wherein the composition comprises any suitable amount of the antifoaming additive or any amount disclosed herein, e.g., from about 0.01 gallons to about 1 gallon, from about 0.05 gallons to about 0.5 gallons, or from about 0.075 gallons to about 0.3 gallons, of the antifoaming additive per barrel of the composition.

Aspect 15. The composition of any one of aspects 1-14, wherein the composition further comprises any suitable weighting additive or any weighting additive disclosed herein.

Aspect 16. The composition of aspect 15, wherein the weighting additive comprises barite (barium sulfate), hematite, calcium carbonate, or any combination thereof.

Aspect 17. The composition of aspect 15 or 16, wherein the composition comprises any suitable amount of the weighting additive or any amount disclosed herein, e.g., from about 100 lb to about 500 lb, from about 150 lb to about 450 lb, or from about 200 lb to about 400 lb, of the weighting additive per barrel of the composition.

Aspect 18. The composition of any one of aspects 1-17, wherein the composition is compatible with an oil-based drilling fluid (or oil-based mud, OBM).

Aspect 19. The composition of any one of aspects 1-18, wherein the composition is compatible with a water-based drilling fluid (or water-based mud, WBM).

Aspect 20. The composition of any one of aspects 1-19, wherein the composition is compatible with a water-based cement slurry.

Aspect 21. The composition of any one of aspects 1-20, wherein a volume of the composition required to reach a conductivity of 175 Hogans in a mixture with 200 mL of OBM, under the test conditions described herein and using the Fann C1001 wettability test apparatus in accordance with API 10B-2, is less than 400 mL, less than 375 mL, less than 350 mL, less than 325 mL, less than 300 mL, or less than 275 mL, of the spacer fluid composition.

Aspect 22. The composition of any one of aspects 1-21, wherein the composition is produced by a process comprising contacting (mixing) the water, clay, and the sulfur-containing polyether surfactant (and any other additives) in any suitable order or sequence.

Aspect 23. A method of treating a subterranean formation comprising a wellbore, a drilling fluid, and a metal casing, the method comprising:
introducing the (spacer fluid) composition of any one of aspects 1-22 into the wellbore to displace at least a portion of the drilling fluid and to treat the metal casing for cement bonding.

Aspect 24. A method of treating a wellbore annulus in preparation for cementing a wellbore, the wellbore annulus comprising an area between a wellbore wall and an exterior of a metal casing, the method comprising:
introducing the (spacer fluid) composition of any one of aspects 1-22 into the annulus to displace at least a portion of a drilling fluid and to treat the exterior of the metal casing for cement bonding.

Aspect 25. The method of aspect 23 or 24, wherein the drilling fluid is an oil-based drilling fluid (or oil-based mud, OBM).

Aspect 26. The method of aspect 23 or 24, wherein the drilling fluid is a water-based drilling fluid (or water-based mud, WBM).

Aspect 27. The method of any one of aspects 23-26, further comprising a step of introducing a cement slurry to the wellbore (annulus) for attaching at least a portion of the casing to the wellbore wall.

Aspect 28. The method of aspect 27, wherein the cement slurry is a water-based cement slurry.

Aspect 29. The method of any one of aspects 23-28, wherein at least about 75 vol %, at least about 85 vol %, or at least about 95 vol %, of the drilling fluid (e.g., remaining in the annulus) is displaced by the (spacer fluid) composition.

Aspect 30. The method of any one of aspects 23-29, wherein a maximum temperature of the wellbore is in a range from about 0° C. to about 225° C., from about 10° C. to about 200° C., from about 20° C. to about 175° C., from about 100° C. to about 175° C., or from about 150° C. to about 225° C.

What is claimed is:

1. A method of treating a wellbore annulus in preparation for cementing a wellbore, the wellbore annulus comprising an area between a wellbore wall and an exterior of a metal casing, the method comprising:
   introducing a spacer fluid composition into the annulus to displace at least a portion of a drilling fluid and to treat the exterior of the metal casing for cement bonding;
   wherein the spacer fluid composition comprises water, a clay, and a mixture of a sulfur-containing polyether surfactant having formula (I) and a sulfur-containing polyether surfactant formula (II):

wherein:
   each R independently is a $C_{10}$-$C_{14}$ alkyl group;
   each R' independently is an ethylene group or a propylene group; and
   each x independently is an integer from 3 to 10.

2. The method of claim 1, wherein:
   each R is a $C_{12}$ alkyl group;
   each R' is an ethylene group; and
   each x independently is an integer from 5 to 9.

3. The method of claim 1, wherein:
the drilling fluid is an oil-based drilling fluid; and
at least about 75 vol % of the drilling fluid in the annulus is displaced by the spacer fluid composition.

4. The method of claim 3, further comprising a step of introducing a cement slurry to the wellbore annulus for attaching at least a portion of the metal casing to the wellbore wall;
wherein the cement slurry is a water-based cement slurry.

5. The method of claim 4, wherein the spacer fluid composition is compatible with the oil-based drilling fluid and the water-based cement slurry.

6. The method of claim 1, wherein a maximum temperature of the wellbore is in a range from about 100° C. to about 175° C.

7. The method of claim 1, wherein a volume of the spacer fluid composition needed to reach a conductivity of 175 Hogans in a mixture with 200 mL of a standard oil-based mud, using a Fann C1001 wettability test apparatus in accordance with API 10B-2 water-wetting capability test (WWCT), is less than 375 mL.

8. The method of claim 1, wherein the spacer fluid composition contains, per barrel of the composition:
from about 2 lb to about 40 lb of the clay; and
from about 0.05 gallons to about 10 gallons of the mixture of the sulfur-containing polyether surfactant having formula (I) and the sulfur-containing polyether surfactant having formula (II).

9. The method of claim 1, wherein the spacer fluid composition contains from about 60 vol % to about 98 vol % of water.

10. The method of claim 1, wherein the spacer fluid composition:
contains from about 0.1 gallons to about 4 gallons of the mixture of the sulfur-containing polyether surfactant having formula (I) and the sulfur-containing polyether surfactant having formula (II) per barrel of the composition;
contains from about 3 lb to about 20 lb of the clay per barrel of the composition; and
has a density from about 9 lb/gallon to about 16 lb/gallon.

11. The method of claim 1, wherein the spacer fluid composition further comprises, per barrel of the composition:
from about 0.05 gallons to about 0.5 gallons of an antifoaming additive; and
from about 150 lb to about 450 lb of a weighting additive.

12. The method of claim 1, wherein the mixture of the sulfur-containing polyether surfactant having formula (I) and the sulfur-containing polyether surfactant having formula (II) has a cloud point in a range from about 55° C. to about 85° C.

13. The method of claim 1, wherein a volume of the spacer fluid composition needed to reach a conductivity of 175 Hogans in a mixture with 200 mL of a standard oil-based mud, using a Fann C1001 wettability test apparatus in accordance with API 10B-2 water-wetting capability test (WWCT), is less than that of an otherwise identical spacer fluid composition containing an ethoxylated alcohol surfactant.

14. The method of claim 1, further comprising a step of introducing a cement slurry to the wellbore annulus for attaching at least a portion of the metal casing to the wellbore wall; wherein:
the drilling fluid is an oil-based drilling fluid;
the cement slurry is a water-based cement slurry; and
a maximum temperature of the wellbore is in a range from about 150° C. to about 225° C.

15. A method of treating a wellbore annulus in preparation for cementing a wellbore, the wellbore annulus comprising an area between a wellbore wall and an exterior of a metal casing, the method comprising:
introducing a spacer fluid composition into the annulus to displace at least a portion of a drilling fluid and to treat the exterior of the metal casing for cement bonding;
wherein the spacer fluid composition comprises:
(i) water,
(ii) a clay,
(iii) a co-solvent,
(iv) an antifoaming additive,
(v) a weighting additive, and
(vi) a mixture of a sulfur-containing polyether surfactant having formula (I) and a sulfur-containing polyether surfactant formula (II):

wherein:
each R independently is a $C_{10}$-$C_{14}$ alkyl group;
each R' independently is an ethylene group or a propylene group; and
each x independently is an integer from 3 to 10.

16. The method of claim 15, wherein:
each R is a $C_{12}$ alkyl group;
each R' is an ethylene group; and
each x independently is an integer from 5 to 9.

17. The method of claim 16, wherein a volume of the spacer fluid composition needed to reach a conductivity of 175 Hogans in a mixture with 200 mL of a standard oil-based mud, using a Fann C1001 wettability test apparatus in accordance with API 10B-2 water-wetting capability test (WWCT), is less than 400 mL.

18. The method of claim 16, wherein the spacer fluid composition contains, per barrel of the composition:
from about 2 lb to about 40 lb of the clay;
from about 0.05 gallons to about 0.5 gallons of the antifoaming additive;
from about 150 lb to about 450 lb of the weighting additive; and
from about 0.05 gallons to about 10 gallons of the mixture of the sulfur-containing polyether surfactant having formula (I) and the sulfur-containing polyether surfactant having formula (II).

19. The method of claim 16, wherein:
the antifoaming additive comprises a polyethylene glycol, a polypropylene glycol, an organosilicone, a siloxane, or a combination thereof; and
the co-solvent comprises a dialkyl ether, diethylene glycol mono butyl ether, or a combination thereof.

20. The method of claim 16, wherein the spacer fluid composition:
contains from about 60 vol % to about 98 vol % of water; and
has a density from about 9 lb/gallon to about 16 lb/gallon.

21. The method of claim 16, wherein a volume of the spacer fluid composition needed to reach a conductivity of 175 Hogans in a mixture with 200 mL of a standard oil-based mud, using a Fann C1001 wettability test apparatus in accordance with API 10B-2 water-wetting capability test (WWCT), is less than that of an otherwise identical spacer fluid composition containing an ethoxylated alcohol surfactant.

* * * * *